United States Patent [19]

Flood et al.

[11] Patent Number: 5,686,002
[45] Date of Patent: Nov. 11, 1997

[54] METHOD OF WELDING

[75] Inventors: Dale A. Flood; Michael R. Porter, both of El Dorado Hills, Calif.

[73] Assignee: Tri Tool Inc., Rancho Cordova, Calif.

[21] Appl. No.: 695,886

[22] Filed: Aug. 12, 1996

[51] Int. Cl.$^6$ .................................................. B23K 9/167
[52] U.S. Cl. ........................... 219/137 R; 219/61; 219/75
[58] Field of Search ............................ 219/137 R, 61, 219/74, 75, 125.11

[56] References Cited

U.S. PATENT DOCUMENTS

| | | | |
|---|---|---|---|
| 2,497,631 | 5/1950 | Rothschild . | |
| 2,871,336 | 1/1959 | Lobosco et al. | 219/74 |
| 2,905,805 | 1/1959 | McElrath et al. . | |
| 3,223,819 | 12/1965 | Witteman | 219/74 |
| 3,309,491 | 3/1967 | Jacobs | 219/137 R |
| 3,470,346 | 9/1969 | Duboz et al. . | |
| 4,034,179 | 7/1977 | Koshiga et al. . | |
| 4,142,085 | 2/1979 | Knipstrom et al. . | |
| 5,347,098 | 9/1994 | Murakami et al. . | |
| 5,532,454 | 7/1996 | Kuhnen . | |

OTHER PUBLICATIONS

Hollingshead and DiGiacomo; "Implementing Orbital GTAW for Tube and Pipe"; (4 pages); undated.
Welding Handbook; vol. 2—Welding Processes; pp. 74–107; 146–149; 260.
Cary; "Modern Welding Technology"; pp. 356–363; Prentice–Hall, Inc., 1979.

*Primary Examiner*—Clifford C. Shaw
*Attorney, Agent, or Firm*—Bacon & Thomas

[57] ABSTRACT

A process for buttwelding metal workpieces having bevelled joint preparations using an automatic GTAW welder using filler wire includes preparing the bevelled workpiece with bevelled joint areas having minimal land thickness at the root extremities; placing the prepared workpiece joint sections together with an open gap between their adjacent root extremities, the gap having a minimum dimension that avoids harmful compression stress between the workpieces due to weld shrinkage and a maximum dimension that avoids filler wire penetration of the gap; fusion welding the open root area of the adjacent workpieces with a root pass weld using an automatic GTAW welder supplied with filler wire and a shield gas including 1 to 10% hydrogen and the balance inert gas; and then promptly overlaying the root pass weld with at least one additional filler weld pass using an automatic GTAW supplied with filler wire and hydrogen-free shield gas.

9 Claims, 1 Drawing Sheet

METHOD OF WELDING

BACKGROUND OF THE INVENTION

1. Field of Invention

This invention relates to a method of buttwelding bevel type open root joints between medium to thick walled workpieces such as carbon steel pipes and fittings using automatic gas tungsten arc welding (GTAW) equipment.

2. Discussion Related Art

Virtually all production or commercial welding performed currently is carried out in accordance with various standards and codes that have been established by recognized professional societies, governmental and industry bodies and organizations, trade associations and testing certification groups. Such "code" welding is exacting and is stringently monitored through inspection procedures implemented at the welding sites or production locations.

The process of buttwelding prepared ends of workpieces such as tubular conduit is itself largely standardized and subject to numerous code specifications. Gas tungsten arc welding or GTAW is extensively used in buttwelding prepared end sections of workpieces such as pipes, flanges and fittings and industry standards dictate the type of end preparation to be used with various thickness workpieces, along with other welding parameters.

In GTAW equipment, a suitable shield gas is supplied to the weld zone while welding is proceeding to obtain a desired welding effect from gas ionization and to protect the weld pool from oxygen and other active gases and contaminants that would adversely affect the molten weld metal until it solidifies. A tungsten (non-consumable) electrode is used to establish and maintain a welding arc between the electrode and base metal of the workpiece by transferring electrical energy into and from the workpiece through the electrode tip in a well known manner. The gas shield is provided to the weld zone throughout the welding process by directing a flow of the gas to the weld zone usually through a shield gas cup or other conduit adjacent or surrounding the electrode so that the entire weld pool area is covered by a suitable protective gas atmosphere. Typical shield gases used include argon and helium, which are inert, either alone or in various mixtures with gases that are somewhat reactive such as carbon dioxide, nitrogen and hydrogen. Hydrogen blended with an inert gas such as argon is also used in some applications when problems created by hydrogen (e.g., porosity of the weld or hydrogen embrittlement of carbon steel) are of no concern and when the increased weld penetration obtainable for a given arc current is desired. A typical argon/hydrogen mixture is 95% argon and 5% hydrogen which is used for thin walled stainless steel GTAW. A mix of 95% argon and 5% hydrogen ("95/5") is typically available in container packages as a standardized shield gas for GTAW.

Generally, argon-hydrogen mixtures are limited to GTAW on stainless steel, nickel-copper and nickel-based alloys and are not recommended for carbon steel welds, at least in the United States, due to concerns over hydrogen embrittlement in the weld zone. On the other hand, it is known to subject carbon steel welds to a heating process to eliminate residual hydrogen that may have been introduced into the weld either due to the presence of hydrogen in the shield gas or from hydrogen present in the weld zone from other sources. The elimination of hydrogen from a weld is a costly and time-consuming process due to the length of time required to maintain the weld in heated condition and is often undesirable due to metallurgical considerations arising from the heating process. In accordance with code welding procedures, porosity in the weld created due to the presence of hydrogen in the shield gas as well as hydrogen embrittlement effects must be strictly avoided.

The GTAW process usually involves using a filler material supplied to the weld zone in the form of a wire having various diameters and metallurgical compositions compatible with the base metal and conforming to code standards.

Currently, automatic GTAW equipment is available that virtually automates the GTAW process in accordance with computer programs written specifically for particular buttweld joints that take into account the geometry of the workpieces, the metallurgy involved, the end preparation used, the specific weld pass to be carried out (e.g., root or filler), the shield gas, the filler metal and other variables such as weld orientation. The programs typically regulate voltage, current, feed rate, filler deposited, shield gas flow and oscillation of the electrode for each weld pass to be made to thereby ensure repeatable code welds meeting all specifications without manual input to the welding process. However, for automatic GTAW equipment to function properly, the ends of the buttweld need to be prepared uniformly so that the program can be set to carry out consecutive weld routines without unpredictable parameters being introduced from one weld routine to the next. An entire industry now exists that produces and markets automatic GTAW equipment and "canned" or "off-the-shelf" programs that can be used for most GTAW procedures.

Despite the highly developed state of automatic GTAW equipment, however, one nagging problem had yet to be resolved before the invention described herein was created. The pipe and fitting industry has established a standardized bevel end preparation using a 37.5° bevel on each end to be buttwelded for a total included weld joint angle of 75°. This type of end preparation, which is illustrated in FIG. 1 of the appended drawings, works well with most gas and arc welding procedures, but poses a particular problem for automatic GTAW applications on medium to thick walled pipes and fittings, particularly carbon steels.

The industry specifications for GTAW procedures on such workpieces requires a "J-prep" configuration that is intended to assure good root pass weld penetration in the root area of the weld, ensure proper weld beads without "suck back" of the weld pool that results in poor weld reinforcement of the root pass weld, and total heat input to the weld that is compatible with the metallurgy of the base metal.

In some cases, the abutting ends are welded while in contact with each other (closed root) or if weld shrinkage induces stress or strain in the weldment or base metal, an appropriate space or gap is left open between the axially projecting lands of the J-prep. A typical specified J-prep configuration for medium to thick wall pipe is shown, for example, in FIG. 3 of the appended drawings.

The problem is thus presented as to how to weld medium to thick buttwelds between standard bevel end preparations on workpieces using automatic GTAW equipment, to eliminate the need to reconfigure the standard bevel ends to be buttwelded and to enhance the utility of automatic GTAW equipment.

It was discovered that attempts to use automatic GTAW equipment with 37.5° bevelled end joints between medium to thick nominal wall thickness stainless steel or carbon steel pipes (i.e., over 0.38 in. or 10 mm) having diameters greater than about 2 in. (5 cm) using typical GTAW programs, shield gases and fillers did not produce acceptable root pass welds for a variety of reasons, particularly the failure to obtain proper weld bead reinforcement inside the pipe due to poor penetration or "suck back" of the weld metal in the root area when the weld pool solidified when an open root was used to avoid shrinkage stresses. Of course, closing the root completely typically produced weld shrinkage stress problems in such workpieces, so an open root weld is virtually required to avoid this problem on larger diameter pipes at least.

It is always desirable in welding metals, particularly alloys, to achieve good weld penetration and fusion of base and filler metals while using the minimum total weld heat (expressed in "Joules") to achieve the weld. It is also usually a requirement of code welding that the internal or back side of a root pass weld show a positive or convex shape above the base metal surface to provide good weld "reinforcement". Suck back, poor penetration and other weld defects adversely affect weld reinforcement in the root area. Automatic GTAW equipment works well to achieve satisfactorily repeatable code root weld passes with good penetration and reinforcement using J-prepped ends, but has not been used with bevel prepped ends on medium to thick workpieces for the reasons mentioned. A solution to the problem was thus needed.

BRIEF SUMMARY OF THE INVENTION

The invention has the objective of carrying out buttwelding using a gas tungsten arc welding procedure (GTAW) on essentially straight bevelled medium to thick walled workpieces and in particular performing a code acceptable root pass weld on an open root configuration of the workpieces (i.e., with a gap between the bevelled ends).

The invention is a method of performing such welds whereby the GTAW root pass weld is carried out using a mix of hydrogen and inert shield gas such as argon and the subsequent filler welds are performed using hydrogen-free shield gas such as argon alone. A 95/5 mixture of argon/hydrogen has been found to work most effectively in the process although some variation in the mixture on either side of 95/5 can likely be tolerated, for example mixtures in the range of from 99/1 to 90/10 argon/hydrogen. It is theorized that any hydrogen that may be included in the weldment is driven out by the subsequent filler weld pass or passes under the protection of an inert gas such as argon. Thus, maintenance of a relatively low hydrogen content in the shield gas combined with a subsequent weld pass or passes over the root pass using hydrogen-free shield gas will avoid any hydrogen embrittlement problems that otherwise might occur while taking advantage of the effects of hydrogen in the shield gas during the root pass weld.

The process works most effectively with minimum end land thickness at the bevel root area (the "land" is simply the thickness of the metal at the extremity of the bevel measured in a radial direction when the weld object is annular or parallel to the transverse thickness direction of the object to be welded), for example in the range of 0.000–0.010 in. (0.000–0.254 mm) for a carbon steel boiler tube 4 in. (10.16 cm.) in diameter. Greater thickness end lands can be tolerated provided that the total Joule heat input required for full penetration is not destructive of or damaging to the alloy components or other metallurgical properties of the base metal or filler wire.

In accordance with the inventive process, a gap between the ends of the workpieces is provided to avoid shrinkage stress at the weld joint without detrimental effect on the quality of the root pass weld using automatic GTAW equipment, filler wire, and 95/5 shield gas. Root gaps should not exceed what is required to avoid shrinkage stresses between the buttwelded sections particularly after the root pass weld by the system. Also, the gap should not exceed the diameter of the filler wire used with the GTAW system to avoid penetration of the gap by the filler wire.

A fuller detailed description of the inventive process follows below in conjunction with the accompanying drawings.

BRIEF DESCRIPTION OF THE DRAWINGS

With reference to the appended drawings.

DETAILED DESCRIPTION OF THE PREFERRED EMBODIMENT(S) OF THE INVENTION

In accordance with this invention, metal workpieces 10,12 to be buttwelded together are prepared so that the ends of the workpieces to be welded are bevelled so as to provide a total included bevel angle B, with each end section of the workpieces 10,12 being bevelled at an angle of B/2. The workpieces 10,12 are illustrated as tubular metal sections, but the principle underlying the invention can be utilized with plate workpieces as well, in which case the butting sections of workpieces 10,12 would be prepared so as to have an appropriate total bevel angle B between the workpieces.

In accordance with the invention, the end sections of the workpieces 10,12 are bevelled so as to leave a land thickness L (FIG. 2) that is dimensioned to provide a uniform gap G between the root extremities of the workpieces and preferably of minimum thickness to ensure a good quality weld penetration between the workpieces using an appropriate heat input (amperage) from an automatic GTAW welder for the weld configuration and workpiece metals involved in the weld procedure. Typically, a minimum land thickness is desirable to enable the first or root pass weld to be carried out between the workpieces in the root area of the joint using a minimum required amperage setting for automatic GTAW equipment to minimize detrimental thermal effects on base metal alloys during the welding operation.

After the workpiece joints are prepared, the workpieces 10,12 are then brought into close proximity so as to leave a root gap G (FIG. 2) that is configured so as to prevent undesirable thermal compression stresses of solidified weld metal upon completion of at least the root pass weld between the workpieces. Also, a gap G that is larger than the diameter of filler wire is to be avoided to prevent the filler passing through the open gap during welding. The dimension of the gap G will accordingly be dependent upon considerations of the metallurgy of the base metal and the filler wire, the wall thickness of the workpiece and the shrinkage potential between the workpiece extremities during welding.

Figure 3:
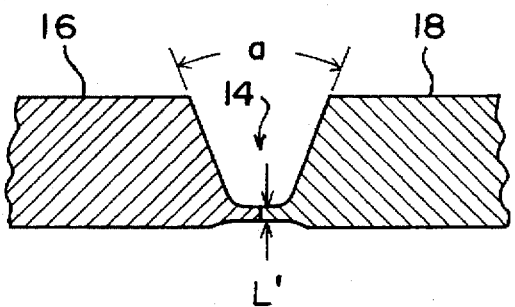
FIG. 3 shows a "J-type" joint preparation conventionally used for buttwelding with automatic GTAW equipment.

The weld procedure in accordance with the invention will use a conventional automatic gas tungsten arc welding device or "GTAW" welder supplied with filler wire and a shield gas. In accordance with prior art procedures, the use of an automatic GTAW welder was not recommended for welding open root bevelled joints and instead the recommended procedure was to use a "J" type end preparation as illustrated in FIG. 3 when automatic GTAW welding equipment was to be used.

The problem arises in making the first weld or "root" pass between the workpieces at the root area of the prepared end sections of the workpieces. It has been found in accordance with prior welding practice that root weld passes with automated GTAW welding equipment require a closed root or "jam up joint" with a defined land thickness L' as illustrated in FIG. 3 between adjacent workpieces to ensure uniform good weld penetration and reinforcement.

Figure 1:
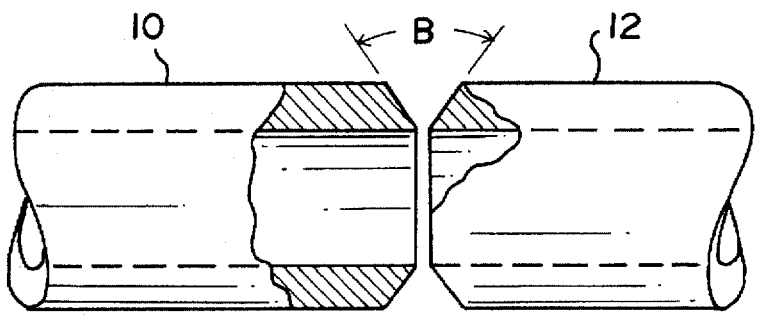
FIG. 1 schematically illustrates a pair of tubular workpieces to be buttwelded having bevelled end joint preparations and an open root gap ready for carrying out a welding procedure in accordance with this invention.
Figure 2:
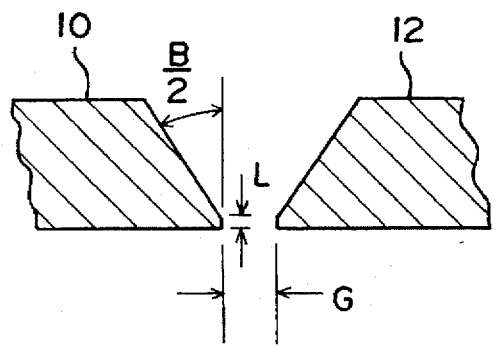
FIG. 2 is an enlarged view of the bevelled joint area between the tubular workpieces illustrated in FIG. 1.

If a bevel joint such as shown in FIGS. 1 and 2 is closed up to eliminate the open root, stresses induced by weld metal shrinkage between the ends of the bevelled workpieces cause poor quality welds in the root area particularly between carbon steel workpieces. These problems can be overcome by using "J-preps" for the weld joint area as illustrated in FIG. 3 which provides a closed root joint 14 between workpieces 16, 18 having sloping surfaces with an included angle a between them, and a precise root end land thickness and configuration that satisfies the requirements of automatic welders that are sensitive to any variations in the weld joint area.

However, it is conventional in certain segments of the metal conduit and fitting industry to furnish conduit and fitting sections with pre-bevelled end sections already prepared for welding with bevel cuts at 37.5°. It is not conventional to provide J-preps 14 as illustrated in FIG. 3 on the end sections 16, 18 of conduit and fittings. Such J-preps are usually done in the field prior to welding and the procedure is both exacting and costly. Indeed, it is not unusual to re-prep straight bevelled end sections to J-preps to enable automatic welders to be used in a high volume production situation.

It has been discovered that an open root bevel joint can be welded using automated GTAW welders to which filler wire and a shield gas is supplied if the following procedure is utilized.

The workpieces are prepared with straight bevel end joints cut to an angle of B/2 as shown in FIG. 2 so as to provide a total included angle B between the ends of the workpieces as illustrated in FIG. 1. The bevels are prepared such that the bevels have desired predetermined end lands L as illustrated in FIG. 2 and explained above. The objective is to make the end lands as uniform and small as possible to enable an automatic welder to be properly programmed to make a root pass weld between the workpieces in the root area of the joint, while enabling the heat input (amperage setting of the welder) to be maintained at a level that will ensure good penetration of the base metal without detrimental metallurgical effect on the base and filler metal in the weld zone.

The workpieces are then brought together so as to provide a gap G between the adjacent root extremities of the workpieces, with the value of G being selected so as to prevent stresses or strains between the workpiece ends due to heat shrinkage of the weld metal, which determines the minimum value of G, and to avoid the filler metal wire passing through the gap between the workpieces during automatic welding, which determines the maximum value of the gap G.

Figure 4:
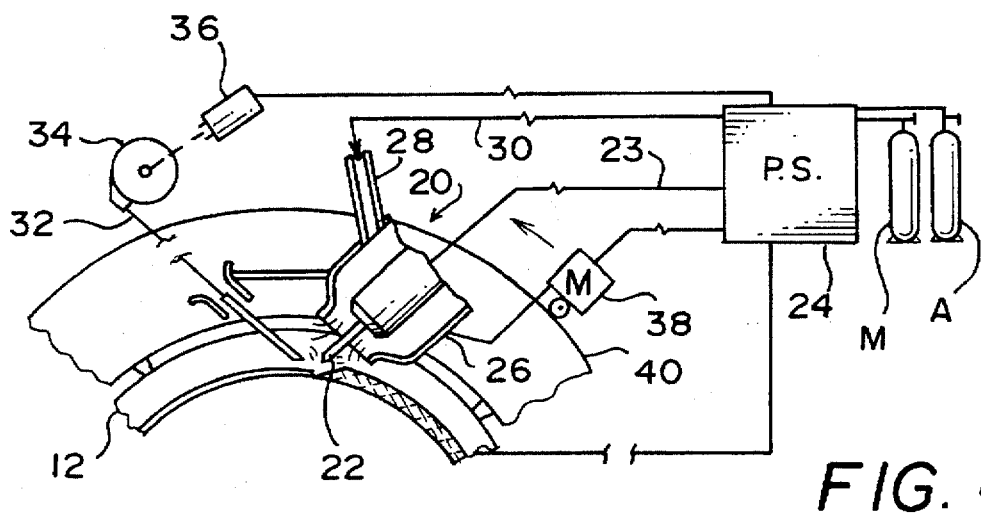
FIG. 4 schematically shows a welding procedure in accordance with this invention being carried out using orbital automatic GTAW equipment supplied with filler wire and both an argon-hydrogen shield gas mixture and argon gas alone.

After preparation of the joint area as shown in FIG. 2, the weld is carried out using automatic GTAW welding equipment as illustrated in FIG. 4. In FIG. 4, an orbital automatic GTAW welder 20 is schematically illustrated as carrying out a welding procedure in a bevelled end joint area between workpieces 10 and 12 (workpiece 12 is only visible in FIG. 4). The GTAW welder 20 is conventional and includes a non-consumable tungsten electrode 22 that is supplied with electrical power from a power supply 24 via line 23 to establish and maintain a welding arc between the workpieces 10,12 and the electrode. The power supply includes various control systems that are operated in accordance with a computerized program for each welding pass between specific workpieces in accordance with conventional automatic GTAW applications.

The GTAW welder 20 includes a housing 26 that receives shield gas through inlet conduit 28 via line 30 under the control of the power supply unit 24 in this example. The shield gas typically is argon that is inert and which may be stored in an appropriate receptacle illustrated at A in FIG. 4. Other shield gases may be utilized in the welding procedure in accordance with known principles and the supply of other gases may be controlled directly through the power supply 24 as illustrated in FIG. 4 or may be independently controlled outside the power supply system.

In accordance with the present invention, a commercial mixture of argon and hydrogen shield gas is supplied to the GTAW welder 20 via the power supply 24 from mixture supply container M and the power supply also can control the supply of argon shield gas alone from supply source A.

Filler wire 32 is automatically supplied to the weld zone from a supply reel 34 under the control of the power supply 24 which regulates operation of a motor 36 that drives the supply reel 34 in accordance with the requirements of the welding program.

The GTAW welder 20 in this example is driven orbitally about the joint area to be welded by means of an appropriate rotary drive mechanism 38 under the control of the power supply 24 using a ring 40 as a guide track for the welder 20.

A critical element of the invention is the use of hydrogen containing shield gas when making the open gap root pass weld in accordance with the invention. Accordingly, during welding the GTAW welder 20 is supplied with a hydrogen-containing shield gas mixture under the control of the power supply 24 for the open gap root pass between the workpieces 10,12 while filler wire 32 is supplied to the weld zone. The composition of the filler wire 32, of course, will correspond metallurgically with the composition of the workpieces or will be constituted of an appropriate composition for the weld that is being carried out. Also in accordance with known principles and standards for GTAW automatic welding, the shield gas supplied through inlet 28 and transported to the weld zone by the shield 26 provides a protective atmosphere in the weld zone to protect the molten weld metal from reacting with oxygen in air or other impurities or contaminants contained in surrounding atmosphere.

Preferably, a blend of 95% argon-5% hydrogen gas ("95/5") has been found to work effectively using an Astro Arc Polysoude automatic orbital GTAW on a 4" diameter medium thickness wall carbon steel boiler pipe having a 37.5° bevel end preparation, a land thickness of from 0.000 to 0.010 in. (0.000 to 0.254 mm) and a 0.035 in. (0.889 mm) gap G between the ends of the pipe at the root area. While the 95/5 mixture is presently preferred, a mixture range between approximately 99% argon-1% hydrogen to 90% argon-10% hydrogen ("99/1 to 90/10") could be used effectively but probably with diminishing results in terms of weld penetration/reinforcement quality as the range of mixture departs from the preferred 95/5 mixture. It is believed a similar weld procedure will produce good quality root pass welds on medium to thick stainless steel pipes over 2 in. (0.5 mm) in diameter as well. The Astro Arc Polysoude equipment included a 300 PC TR Power supply with automatic voltage control and an MUIII weld head. The root pass was made without electrode oscillation with an appropriate current/voltage adjustment for a 95/5 gas mixture.

It was observed that the presence of hydrogen in the arc area tended to stabilize the weld pool and to center it within the gap area to provide good penetration and filling in the root area of the weld as compared with a similar automatic GTAW weld procedure without a hydrogen-containing shield gas. The reason for this is not completely understood, but the effect was unexpected. Moreover, the use of hydrogen generally is to be avoided when welding carbon steel due to hydrogen inclusion in the weld.

After the root pass weld has been completed, the GTAW welder is brought back to a starting position by motor 38 and at least one subsequent "filler" weld pass is promptly made using a hydrogen-free shield gas such as argon alone in accordance with known automatic orbital GTAW welding procedures preferably while the root pass weld is still hot.

The use of hydrogen-containing shield gas with carbon steel welding procedures is usually avoided in conventional welding practice, at least in the United States, to avoid hydrogen entrapment in the weld joint that causes weakness in the weld due to a phenomenon called "hydrogen embrittlement." However, as noted previously, the use of hydrogen-containing shield gas, preferably a 95% argon-5% hydrogen mixture has been found to produce a good quality root pass welds with an open gap between bevelled workpieces due to the beneficial effects of the hydrogen in the weld zone. The inventive solution of the hydrogen embrittlement problem is to make subsequent weld passes over the root pass using argon alone to heat the root pass weld sufficiently to eliminate any residual hydrogen that may exist in the weld.

While argon is preferred for the overlying or filler passes, it is only essential that the filler shield gas be hydrogen-free.

The illustrations contained in the drawings are intended to depict applications of the process in accordance with the invention but are not intended to limit the scope of the inventive process which is defined in the claims that follow below.

What is claimed is:

1. A process of buttwelding metal workpieces having bevel joint preparations using an automatic GTAW welder using filler wire comprising:

preparing the bevelled workpieces with bevel joint areas having minimal land thicknesses at their root extremities;

placing the prepared workpiece joint sections together with an open gap between their adjacent root extremities, the gap having a minimum dimension that avoids harmful compression stress between the workpieces due to weld shrinkage and a maximum dimension that avoids filler wire penetration of the gap;

fusion welding the open root area of the adjacent workpieces with a root pass weld using an automatic GTAW welder supplied with filler wire and a shield gas including 1 to 10% hydrogen and the balance inert gas; and then overlaying the root pass weld with at least one additional filler weld pass using an automatic GTAW welder supplied with filler wire and hydrogen-free shield gas.

2. The process according to claim 1 wherein the bevel joint area of each workpiece is bevelled at 37.5°, the end land thickness of the joint ends are in the range of approximately 0.000 to 0.010 in. (0.000–0.254 mm), the gap dimension is about 0.035 in. (0.889 mm) and the workpieces are medium to thick wall thickness carbon steel pipes.

3. The process according to claim 1, wherein the inert gas is argon.

4. The process to claim 1, wherein the shield gas is 95% argon and 5% hydrogen.

5. The process according to claim 1, wherein the workpiece is tubular and wherein the root pass and overlaying welds are carried out using an orbital automatic GTAW welder supplied with said filler wire and shield gas.

6. The process according to claim 1, wherein the overlaying wild following the root pass is carried out using argon shield gas.

7. The process according to claim 1, wherein the metal workpieces to be welded are carbon steel.

8. The process according to claim 7, wherein the metal workpieces are tubular conduits and fittings for such conduits.

9. The process according to claim 8, including using an orbital automatic GTAW welder for the welding passes.

* * * * *

UNITED STATES PATENT AND TRADEMARK OFFICE
Certificate

Patent No. 5,686,002                                            Patented: November 11, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dale A. Flood, El Dorado Hills, CA; Michael R. Porter, El Dorado Hills, CA; and Randolph C. Oliver, Newport, VA.

Signed and Sealed this Tenth Day of December 2002.

TOM DUNN
*Supervisory Patent Examiner*
Art Unit 1725